United States Patent
Gerthoffert et al.

(10) Patent No.: US 8,924,046 B2
(45) Date of Patent: Dec. 30, 2014

(54) COMBINED STAND-BY INSTRUMENT AND METHOD FOR CALIBRATING THE COMBINED STAND-BY INSTRUMENT

(75) Inventors: Damien Gerthoffert, Vendome (FR); Florent Colliau, Chambon sur Cisse (FR); Yves Jaulain, Scorbe Clairvaux (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/302,947

(22) Filed: Nov. 22, 2011

(65) Prior Publication Data

US 2012/0303184 A1   Nov. 29, 2012

(30) Foreign Application Priority Data

Nov. 23, 2010   (FR) ...................................... 10 04558

(51) Int. Cl.
  *G01C 23/00*   (2006.01)
  *G01C 17/38*   (2006.01)
(52) U.S. Cl.
  CPC ............... *G01C 23/00* (2013.01); *G01C 17/38* (2013.01)
  USPC .................. 701/7; 701/14; 340/945; 340/973
(58) Field of Classification Search
  CPC ......... G01C 23/00; G01C 23/05; G01C 17/38
  USPC .................................. 701/7, 14; 340/945, 973
  See application file for complete search history.

(56) References Cited

U.S. PATENT DOCUMENTS

| 4,143,467 | A | * | 3/1979 | Erspamer et al. | ............... | 33/356 |
| 4,720,992 | A | * | 1/1988 | Hormel | ............... | 73/1.76 |
| 7,154,267 | B2 | * | 12/2006 | Withanawasam | ............... | 324/244 |
| 2006/0212182 | A1 | * | 9/2006 | Shaw | ............... | 701/12 |

FOREIGN PATENT DOCUMENTS

| FR | 2937415 | * | 10/2008 | ............ | G01C 23/00 |
| FR | 2937415 | A1 | 4/2010 | | |

* cited by examiner

*Primary Examiner* — Mary Cheung
*Assistant Examiner* — Brian P Sweeney
(74) *Attorney, Agent, or Firm* — Baker & Hostetler LLP

(57) ABSTRACT

A combined stand-by instrument intended to be fitted to the instrument panel of an aircraft, and a method for calibrating the combined stand-by instrument, comprises anemobarometric sensors, inertial sensors, a magnetic field sensor, a screen and a computer making it possible to determine and to display on the screen an altitude, a speed, an attitude and a current heading of the aircraft on the basis of the sensors and to calibrate the magnetic field sensor. The computer is configured to allow the simultaneous display on the screen of the altitude, of the speed and of the attitude of the aircraft as well as a guide for the calibration of the magnetic field sensor.

15 Claims, 2 Drawing Sheets

COMBINED STAND-BY INSTRUMENT AND METHOD FOR CALIBRATING THE COMBINED STAND-BY INSTRUMENT

CROSS-REFERENCE TO RELATED APPLICATION

This application claims priority to foreign French patent application No. FR 1004558, filed on Nov. 23, 2010, the disclosure of which is incorporated by reference in its entirety.

FIELD OF THE INVENTION

The invention relates to a combined stand-by instrument and a method for calibrating the combined stand-by instrument. Such an instrument is intended to be fitted to the instrument panel of an aircraft. It comprises a computer making it possible to determine an altitude, a speed and an attitude of the aircraft on the basis of sensors belonging to the instrument and a screen making it possible to display the altitude, the speed and the attitude of the aircraft. This instrument makes it possible to supply the pilot of the aircraft with flight information used in the case of a fault with the aircraft's primary onboard instruments.

BACKGROUND

The pilot of the aircraft also needs navigation information allowing him to follow a flight plan. Amongst this information, the heading allows him to direct the aircraft with respect to magnetic North. The heading may be obtained on the basis of a magnetic sensor generally situated far from the instrument panel. Indeed, this sensor, measuring the terrestrial magnetic field, may be disturbed by the aircraft itself and notably by the onboard instruments which generate electromagnetic disturbances. These instruments being numerous in the instrument panel, it is sought to move the magnetic sensor further away, by placing it outside the cockpit of the aircraft for example.

A course compass is also provided as stand-by in the cockpit of the aircraft so as to alleviate any defect in the primary information chain presenting the heading information to the pilot. This stand-by compass is commonly placed in the top part of the canopy of the cockpit, this location being furthest from the other onboard instruments, therefore the least disturbed by them.

Although the magnetic sensors are placed in the locations that are as little disturbed as possible, a magnetic deviation persists that it is necessary to compensate. For this purpose, a compensation procedure is provided, making it possible to correct the effects of the aircraft and of all the instruments that it comprises. This procedure makes provision for example to measure the direction of the magnetic field by means of the sensor to be compensated for during angular displacements of the aircraft on an aerodrome runway. The measurements are thereafter compared with the terrestrial magnetic field of the aerodrome so as to establish a deviation curve that it will be possible to use in flight to compensate for the disturbances on the sensor. Accordingly, a specific instrument is connected to the sensor, the former making it possible to directly recover the measurement made by the sensor before this measurement is processed to obtain a display readable by the aircraft pilot. The magnetic sensor associated with the primary instruments as well as the stand-by compass may be compensated.

Moreover, it has been attempted to use the stand-by instrument to determine and display the heading followed by the aircraft. This heading may be used when the aircraft's primary instruments have failed as for example described in patent application FR 2 937 415. This document describes the use of magnetic sensors internal to the stand-by instrument to determine and display the heading followed by the aircraft. This document also describes a calibration procedure using the stand-by instrument itself and its display screen. This calibration procedure is beneficial since it does not require any specific instrument having to be connected to the stand-by instrument for the processing of the data gathered. In practice this procedure is usable only under conditions where the aircraft's primary instruments are operating correctly. Indeed the calibration procedure described in document FR 2 937 415 makes complete use of the screen of the stand-by instrument during calibration. During calibration it is impossible to access the basic information delivered by the stand-by instrument such as the altitude, the speed and the attitude of the aircraft. For example, in flight, when the primary instruments have failed, the pilot uses the stand-by instrument to ascertain the flight information necessary for piloting. If magnetic calibration of the stand-by instrument is necessary, this calibration deprives the pilot of all flight information during the calibration, which may be prejudicial to flight safety.

In civilian aeronautics, a procedure exists which makes provision for a flight during which the aeroplane undergoes acceptance testing. During this flight, all the instruments must be operational, the primary instruments and the stand-by instruments. Consequently, it is impossible to use this flight to perform the calibration of the magnetic sensors internal to the stand-by instrument. The use of another flight for calibration entails additional costs for the aircraft manufacturer.

SUMMARY OF THE INVENTION

The invention alleviates this problem by allowing a procedure for magnetic calibration of the stand-by instrument without losing the display of the flight information.

In one aspect, the invention provides a combined stand-by instrument intended to be fitted to the instrument panel of an aircraft and comprising anemobarometric sensors, inertial sensors, a magnetic field sensor, a screen and a computer making it possible to determine and to display on the screen an altitude, a speed, an attitude and a current heading of the aircraft on the basis of the sensors and to calibrate the magnetic field sensor, characterized in that the computer is configured to allow simultaneously:

the determination and the display on the screen of the altitude, of the speed and of the attitude of the aircraft, the calibration of the magnetic field sensor and the display on the screen of a guide for the calibration of the magnetic field sensor.

In another aspect, the present invention is a method for calibrating a combined stand-by instrument intended to be fitted to the instrument panel of an aircraft and comprising anemobarometric sensors, inertial sensors, a magnetic field sensor, a screen and a computer making it possible to determine and to display on the screen an altitude, a speed, an attitude and a current heading of the aircraft on the basis of the sensors, characterized in that it consists in carrying out simultaneously:

the determination and the display on the screen of the altitude, of the speed and of the attitude of the aircraft, the calibration of the magnetic field sensor and the display on the screen of a guide for the calibration of the magnetic field sensor.

The simultaneous operations may be carried out by a single processor carrying out pseudo-parallel tasks in a manner transparent to a user. Stated otherwise, the user retains a continuous service at one and the same time in respect of the calibration and in respect of the reading on the screen of the flight parameters (altitude, speed and attitude of the aircraft).

BRIEF DESCRIPTION OF THE DRAWINGS

The invention will be better understood and other advantages will become apparent on reading the detailed description of an embodiment given by way of example, description illustrated by the appended drawing in which.

For the sake of clarity, the same elements will bear the same tags in the various figures.

DETAILED DESCRIPTION

A stand-by instrument makes it possible to determine and to display in an autonomous manner, an altitude, a speed, an attitude and a heading of the aircraft on the basis of sensors belonging to the instrument. In the case of a defect with the primary instruments or defects of display of the primary-viewing screens, the screen of the stand-by instrument is used by the pilots of the aircraft. In the flight phase, the pilots nonetheless observe the screen of the stand-by instrument and note any discrepancies with the information delivered by the primary instruments.

Figure 1:
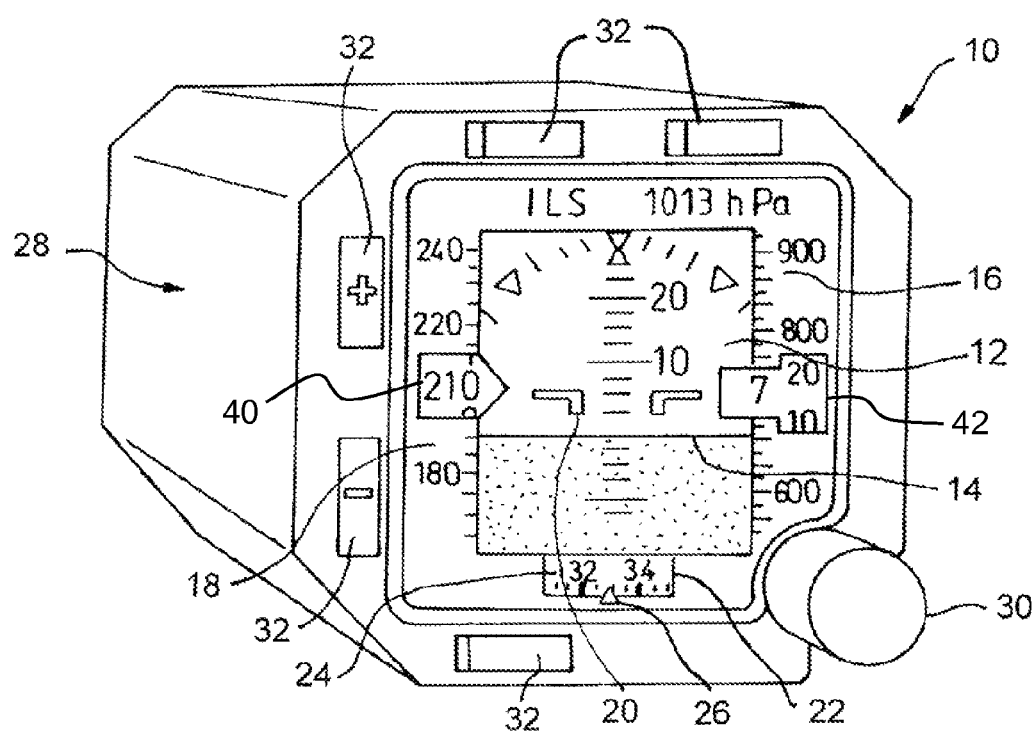
FIG. 1 represents a combined stand-by instrument whose display is in operational mode.

FIG. 1 represents a combined stand-by instrument 10 fitted to the instrument panel of an aircraft. The instrument 10 comprises a colour screen 12 used in operational mode for the display of a horizon 14 (earth in brown below, sky in blue above) and of stand-by data necessary for piloting, namely principally altitude in the form of a scrolling graduated scale 16 on the right, speed in the form of another scrolling graduated scale 18 on the left, and an aircraft attitude symbol 20. An area 22 is reserved for the heading information presented also in the form of a graduated scale 24 scrolling past a fixed index 26. Another graduated scale 28 allows the display of the roll of the aircraft. The scale 28 is for example fixed and an index 30 can move past the various values of the scale to indicate the roll of the aircraft.

The display of the horizon and of the numerical data for speed, altitude and heading is determined by a computer 32 situated in the body of the instrument 10 on the basis of signals originating from sensors some of which are outside the instrument 10 and others of which may be inside or outside the instrument 10. The sensors are in general pressure or flowrate sensors (for the speed and for the altitude) and an inertial measurement unit for the attitude and one or more magnetic field sensors commonly called magnetometers for the heading. Advantageously, the pressure sensors, the inertial measurement unit and the magnetometer are situated inside the instrument 10. The pressure sensors are linked to pressure taps situated on the skin of the aircraft and making it possible to measure the static pressure and the total pressure of the air surrounding the aircraft.

The instrument 10 comprises in general an adjustment button 34 serving for the readjustment of the atmospheric pressure as a function of locally communicated data (for example provided by the meteorology services in proximity to an airport). It comprises other control buttons 36 serving for diverse uses (horizon readjustment, placement on the screen of marks of authorized ranges of speed or altitude, etc.).

Figure 2:
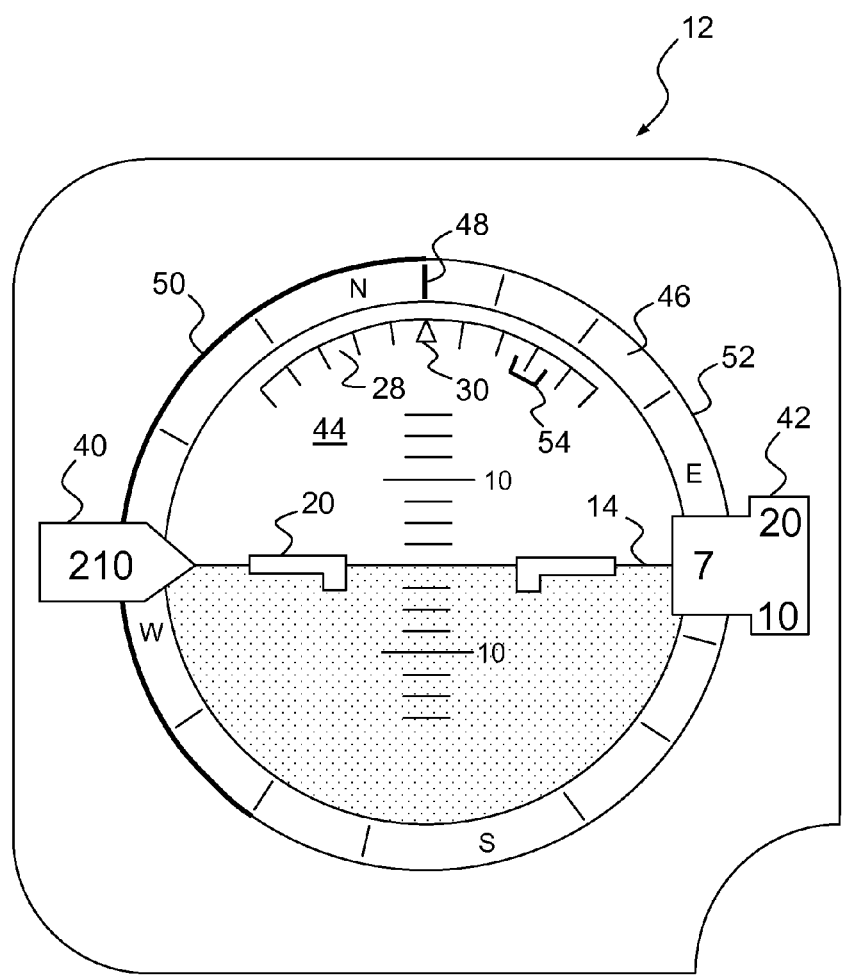
FIG. 2 represents a combined stand-by instrument whose display is in calibration mode.

FIG. 2 represents the screen of the combined stand-by instrument 10 whose display is in magnetometer calibration mode. The computer 32 of the combined stand-by instrument is configured to allow the simultaneous display on the screen 12 on the one hand of the altitude, of the speed and of the attitude of the aircraft and on the other hand of a guide for the calibration of the magnetic field sensor. So as not to disturb the aircraft pilot, the displays of artificial horizon 14 and of the aircraft attitude symbol 20 are identical in both modes, operational and calibration. Also apparent are the graduated scale 28 and the index 30 allowing the display of the aircraft roll.

The scrolling graduated scales for the speed and the altitude are simplified and in the example represented, only magnifying glasses, 40 for the speed and 42 for the altitude, are retained. These magnifying glasses reproduce a mechanical display effected by means of juxtaposed wheels rotating about a horizontal axis. By rotating, the wheels scroll vertically past a window so as reveal only the current value of the speed or altitude. These windows, called magnifying glasses 40 and 42, are reproduced on the screen 12 and are apparent in the operational-mode display of FIG. 1.

On the other hand, the central area 44 of the screen 12, reserved for the horizon, is no longer square or rectangular as in the operational mode but in the shape of a circle surrounded by a wind rose 46 indicating the current heading followed by the aircraft. The current heading may be given by an external reference.

A fixed tag 48 indicates the current heading with respect to the wind rose 46 which is mobile in rotation about the area 44.

The guide for the calibration of the magnetic field sensor comprises for example a program of headings that the aircraft must achieve in order to carry out the calibration. This program is stored in a memory of the computer 32. Moreover, the computer is configured to determine and display, during calibration, indications of headings already achieved and indications of headings remaining to be achieved in order to terminate the calibration. The headings already achieved and the headings remaining to be achieved may be displayed on the outline of the wind rose 46. In the example of FIG. 2, the headings already achieved are represented by a thick line 50 and the headings to be achieved are represented by a thin line 52. In practice, it is possible to use a colour code on the outline of the wind rose 46. The outline is green for the headings achieved and red for the headings to be achieved.

Running through the whole of the wind rose 46 with zero roll makes it possible to calibrate the magnetic field sensor in two dimensions in a horizontal plane. It is also possible to carry out a calibration in three dimensions by supplementing the program of headings in a horizontal plane with a program of headings to be achieved with a non-zero roll. In practice, the pilot is required to carry out a first complete revolution of the wind rose with a positive roll and a second revolution with a negative roll. A roll setpoint is for example given at the tag 54. To achieve this roll, the pilot must make the index 30 coincide with the setpoint 54.

The program of headings and optionally of rolls to be achieved belongs to a first step of a calibration procedure. As soon as the program is carried out by the pilot, a second step of the calibration procedure is launched. During this second step the computer 32 determines calibration factors for the magnetic field sensor as a function of the type of calibration adopted, with or without roll.

The second step can make provision to compare the calibration factors determined with predetermined limit values. If one of the factors is outside of its limit values, an alert message appears on the screen 12 and an invitation is made to the pilot to recommence the calibration procedure and its two steps.

Stated otherwise during the calibration of the magnetic field sensor, the following operations are strung together:
- choosing between calibration in two dimensions or in three dimensions;
- acquiring data measured by the magnetic field sensor by following a program of headings to be run through without roll in the case of a calibration in two dimensions or with and without roll in the case of a calibration in three dimensions;
- determining calibration factors for the magnetic field sensor as a function of the calibration adopted, in two dimensions or in three dimensions;

the calibration guide making it possible to follow the progress of the program of headings to be run through with and/or without roll during the acquisition of the data.

The invention claimed is:

1. A combined stand-by instrument configured to be fitted to an instrument panel of an aircraft, comprising:
   anemobarometric sensors,
   inertial sensors,
   a magnetometer arranged either internally within the stand-by instrument or arranged externally to the stand-by instrument,
   a screen, and
   a computer configured to determine and to display on the screen an altitude, a speed, an attitude, and a current heading of the aircraft on a basis of the sensors and to calibrate the magnetometer,
   the computer being further configured to operate to simultaneously provide:
      determination and display on the screen of the altitude, the speed and the attitude of the aircraft,
      calibration of the magnetometer, and
      generation and display on the screen of a guide for the calibration of the magnetometer.

2. The combined stand-by instrument according to claim 1, wherein the computer is further configured to determine and display, during calibration, indications of headings already achieved and indications of headings remaining to be achieved in order to terminate the calibration,
   wherein the determination is on a basis of a program stored in a memory of the computer and defining headings that the aircraft must achieve in order to carry out the calibration.

3. The combined stand-by instrument according to claim 1, wherein the computer is configured to determine and display, during calibration, indications of headings and of rolls already achieved; and
   the computer is further configured to determine indications of headings and display of rolls remaining to be achieved in order to terminate the calibration,
   wherein the determination is on a basis of a program stored in a memory of the computer and defining headings and rolls that the aircraft must achieve in order to carry out the calibration.

4. The combined stand-by instrument according to claim 1, wherein the magnetometer is arranged externally to the stand-by instrument.

5. The combined stand-by instrument according to claim 1, wherein the magnetometer is arranged internally within the stand-by instrument.

6. The combined stand-by instrument according to claim 1, wherein the computer is further configured to generate a roll set point and display the roll set point on the screen.

7. The combined stand-by instrument according to claim 1, wherein the computer is configured to determine and display, during calibration, headings and rolls required for calibration that have been completed by the aircraft; and
   the computer is further configured to determine headings and display of rolls remaining for calibration that are required to be completed by the aircraft in order to terminate the calibration.

8. The combined stand-by instrument according to claim 1, wherein the computer is configured to determine and display, during calibration, headings required for calibration that have been completed by the aircraft; and
   the computer is further configured to determine and display headings remaining for calibration that are required to be completed by the aircraft in order to terminate the calibration.

9. A method for calibrating a combined stand-by instrument configured to be fitted to an instrument panel of an aircraft and comprising anemobarometric sensors, inertial sensors, a magnetometer arranged either internally within the stand-by instrument or arranged externally to the stand-by instrument, a screen and a computer configured to determine and to display on the screen an altitude, a speed, an attitude and a current heading of the aircraft on a basis of the sensors, the method comprising simultaneously the steps of:
   determination of the altitude, the speed, and the attitude of the aircraft with sensors including at least one of the anemobarometric sensors and the inertial sensors,
   displaying the altitude, the speed and the attitude of the aircraft on the screen,
   calibration of the magnetometer utilizing the computer, and
   displaying on the screen a guide for the calibration of the magnetometer generated by the computer.

10. The method according to claim 9, further comprising calibrating the magnetometer by the following steps:
    receiving by the computer a selection of calibration in two dimensions or in three dimensions;
    acquiring data with the computer measured by the magnetometer by following a program of headings to be run through without roll during a calibration in two dimensions or acquiring data with the computer measured by the magnetometer by following a program of headings to be run through with and without roll during a calibration in three dimensions;
    determining calibration factors for the magnetometer with the computer as a function of the calibration adopted, in two dimensions or in three dimensions; and
    generating the calibration guide to provide a progress of the program of headings to be run through with and/or without roll during the acquisition of the data.

11. The method according to claim 9, wherein the magnetometer is arranged externally to the stand-by instrument.

12. The method according to claim 9, wherein the magnetometer is arranged internally within the stand-by instrument.

13. The method according to claim 9, further comprising:
    generating a roll set point with the computer; and
    displaying the roll set point on the screen.

14. The method according to claim 9, further comprising:
    determining with the computer, during calibration, indications of headings already achieved and indications of headings remaining to be achieved in order to terminate the calibration; and
    displaying on the screen the indications of headings already achieved and indications of headings remaining to be achieved in order to terminate the calibration, wherein the determination is on a basis of a program stored in a memory of the computer and defining headings that the aircraft must achieve in order to carry out the calibration.

15. The method according to claim 9, further comprising:

determining with the computer, during calibration, headings and rolls already achieved and headings and rolls remaining to be achieved in order to terminate the calibration; and displaying on the screen headings and rolls already achieved and headings and rolls remaining to be achieved in order to terminate the calibration, wherein the determination is on a basis of a program stored in a memory of the computer and defining headings and rolls that the aircraft must achieve in order to carry out the calibration.

\* \* \* \* \*